United States Patent [19]

Underwood

[11] Patent Number: 5,601,303
[45] Date of Patent: Feb. 11, 1997

[54] COMBINE TRAILER

[75] Inventor: Mark R. Underwood, Burr Oak, Kans.

[73] Assignee: Deere & Company, Moline, Ill.

[21] Appl. No.: 277,954

[22] Filed: Jul. 20, 1994

[51] Int. Cl.$^6$ ........................................................ B60F 5/00
[52] U.S. Cl. .................... 280/414.5; 280/415.1; 280/475; 180/93
[58] Field of Search .............................. 280/414.5, 400, 280/401, 402, 404, 408, 415.1, 475, 476.1; 414/458, 339, 340; 37/403; 180/9.3

[56] References Cited

U.S. PATENT DOCUMENTS

| | | | |
|---|---|---|---|
| 1,332,388 | 3/1920 | Egan | 280/402 |
| 1,864,781 | 6/1932 | Wells | 280/402 |
| 3,460,691 | 8/1969 | Wieger et al. | 280/415.1 |
| 3,929,241 | 12/1975 | Putnum | 414/458 |
| 4,147,373 | 4/1979 | Cully | 280/402 |
| 4,819,955 | 4/1989 | Cobb | 280/404 |
| 5,042,831 | 8/1991 | Kuhns | 280/402 |

FOREIGN PATENT DOCUMENTS

| | | | |
|---|---|---|---|
| 0458515 | 8/1949 | Canada | 280/415.1 |
| 0523965 | 7/1957 | Italy | 280/415.1 |
| 0552438 | 8/1958 | Italy | 280/415.1 |

*Primary Examiner*—Anne Marie Boehler
*Attorney, Agent, or Firm*—Felsman, Bradley, Gunter & Dillon, LLP

[57] ABSTRACT

A trailer assembly is provided for towing a vehicle having a lift arm which can be raised and lowered. The trailer assembly utilizes a front and rear frame support which are coupled to opposite ends of the frame of the vehicle being towed. A support leg, which is pivotally mounted to the front frame support, is coupled to the lift arm of the vehicle so that a support end of the support leg engages the ground, lifting the front frame support and causing the vehicle being towed to be raised off the ground. The rear frame support also has wheels which can be retracted and extended to facilitate lifting of the vehicle.

20 Claims, 5 Drawing Sheets

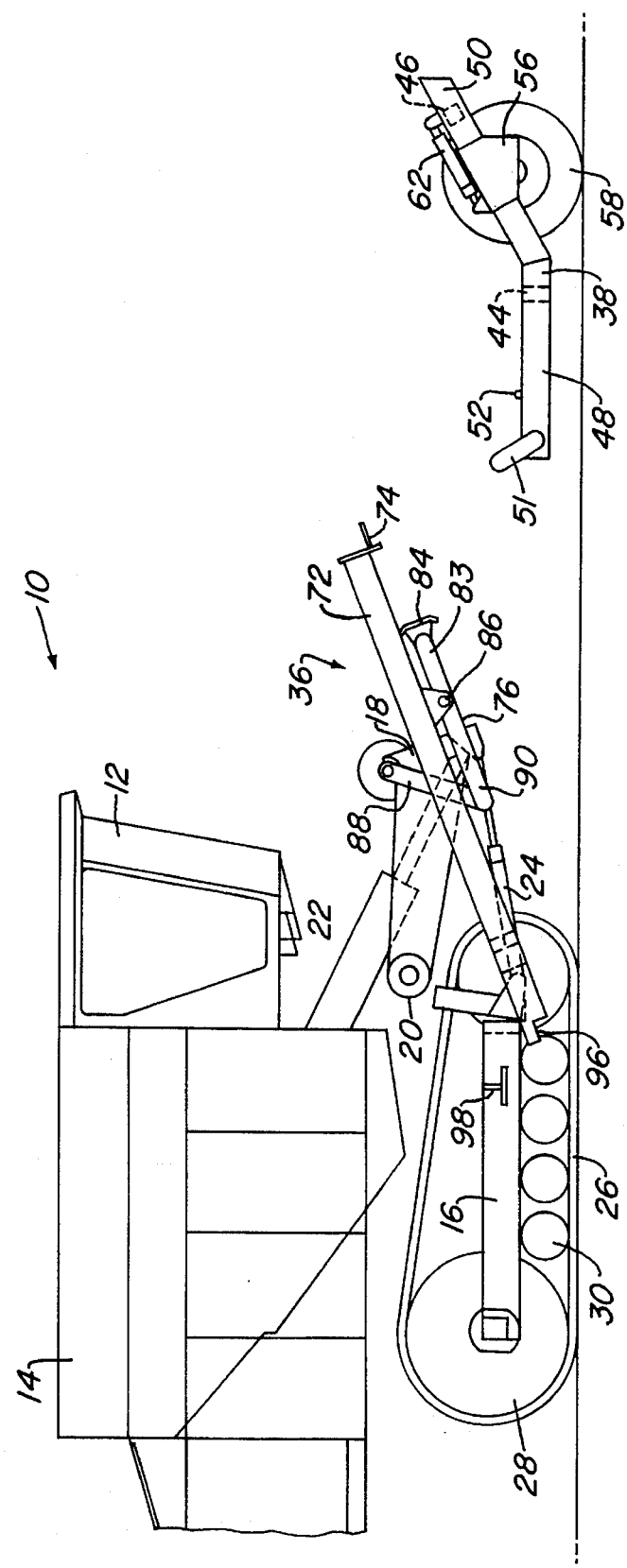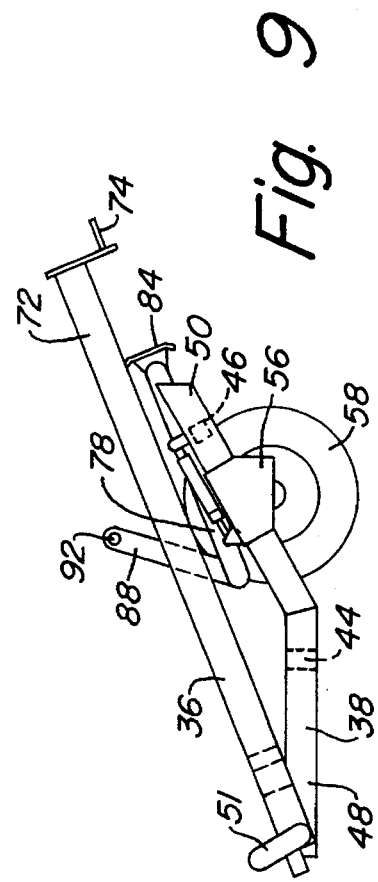

COMBINE TRAILER

BACKGROUND OF THE INVENTION

1. Field of the Invention

This invention relates to a trailer assembly for towing a wheeled or tracked vehicle, and in particular to a trailer assembly for towing a vehicle having a lift arm which can be utilized with the trailer assembly in raising and lowering the vehicle off the ground so that the vehicle is fully supported by the trailer assembly for towing.

2. Description of the Prior Art

It is sometimes desirable, and any many cases necessary, to transport large heavy vehicles over conventional roadways where it would be impractical or even dangerous to operate the vehicles under their own power. Self-propelled farm and earth moving equipment having hydraulic lift equipment, such as combines, bulldozers, backhoes, front-end loaders and the like, in particular, are usually not well suited to be driven on many public streets and highways. In order to transport these vehicles, trailers are used to haul the vehicles from place to place.

The most common trailer used for this purpose are the flatbed type trailers which have a large enough surface area to fully support the vehicle being towed. Other trailers that have been specially designed and constructed for use solely with the specific type of vehicle needed to be hauled are also used. In either case, the vehicle must be driven onto the trailer and properly positioned. Once the vehicle is properly positioned, the vehicle is usually secured to the trailer by means of lines, chains or ropes. These prior art trailers usually take up a large amount of space and are often quite heavy themselves, adding additional weight that must be towed along with the vehicle.

What is needed is a lightweight trailer for towing vehicles having hydraulic lift equipment which is easy to store, can be used on various vehicles, consumes very little space and does not require that the vehicle be driven onto the trailer.

SUMMARY OF THE INVENTION

A trailer assembly couples to a hitch of a tow vehicle for towing a second vehicle which is supported on the ground. The second vehicle has a frame and a lift arm which can be moved between a raised and lowered position. A first frame support releasably couples to one end of the frame and has at least one wheel mounted thereon. A second frame support is releasably coupled to an opposite end of the frame so that the frame of the second vehicle forms an intermediate section which couples the first and second frame supports together.

A support leg is pivotally mounted to the second frame support and is releasably coupled to the lift arm of the second vehicle. The support leg has a support end which engages the ground when the lift arm is moved to one of the raised and lowered positions. This causes the second frame support to lift the second vehicle off the ground so that it is supported on the first and second frame supports for towing.

BRIEF DESCRIPTION OF THE DRAWINGS

FIG. 8 is a side view of the front and rear frame supports prior to being coupled together for storage and transport.

FIG. 9 is a side view of the front and rear frame supports coupled together for storage and transport.

DETAILED DESCRIPTION OF THE INVENTION

Figure 1:
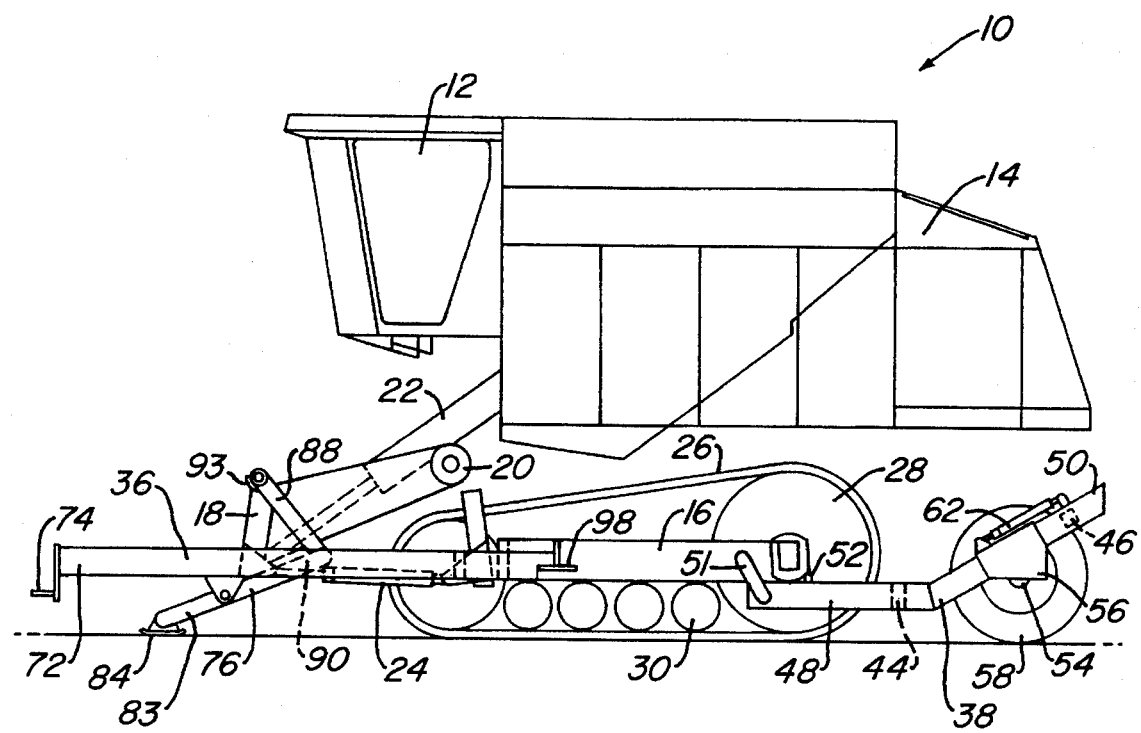
FIG. 1 shows a side view of a trailer assembly coupled to a frame of a combine and constructed in accordance with the invention.

FIG. 1 shows a combine 10 of conventional design having a cab 12 mounted to a body 14 which is supported on a frame 16 of the combine 10. The combine 10 has a header attachment 18 which is used to support a header (not shown). The header is conventional, having a sickle, reel and an auger for cutting and collecting crop. The crop passes through conveyor means on header attachment into a threshing section of combine 10. It should be noted that the combine 10 is shown for illustrative purposes only. Other vehicles or self-propelled equipment having a lift arm or lift cylinder, such as a bulldozer, backhoe, etc. could also be towed with the trailer assembly described herein.

The header attachment 18 is provided with a lift cylinder 22 and a push cylinder 24 for raising and lowering the header attachment 18 about a pivot point 20 between a raised and lowered position. The lift and push cylinders 22, 24 are conventional hydraulic piston and cylinders. As shown in FIG. 1, the combine 10 is driven by continuous tracks mounted around drive wheels 28 and rollers 30. While the embodiment shown in FIG. 1 employs the use of tracks 26, it should be noted that conventional tires and wheels may also be used with the combine 10 or for other vehicles.

Figure 2:
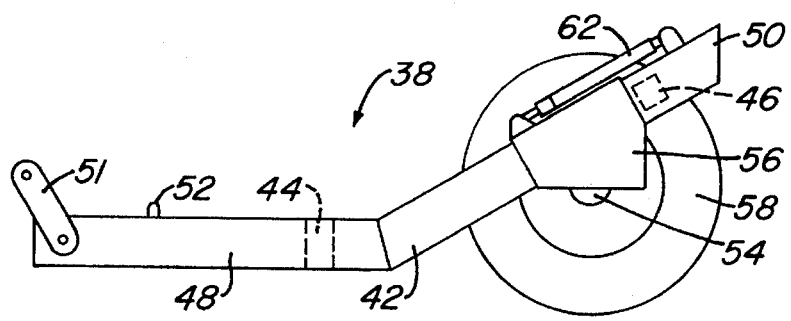
FIG. 2 is a side view of rear frame support of the trailer assembly of FIG. 1 constructed in accordance with the invention.

The trailer assembly of the invention is comprised of a front frame support 36 and rear frame support 38 which are coupled to the frame 16 of the combine 10 so that the frame 16 forms an intermediate section of the trailer assembly. The rear frame support 38 is shown in more detail in FIGS. 2 and 3.

The rear frame support 38 consists of two support members 40, 42 (FIG. 3) which are laterally spaced apart approximately the width of the frame 16. The two support members 40, 42 are joined together by means of cross members 44, 46. As can be seen more clearly in FIG. 2, the support members 40, 42 consist of a forward, horizontal portion 48 and a rearward, angled portion 50. Each horizontal portion 48 of the support members 40, 42 are parallel to each other and remain substantially level in relation to the ground when coupled to the frame 16 of the combine 10. The cross member 44 extends between the horizontal portion 48 of the support members 40, 42. Bolted to each horizontal portion 48 is a linkage 51 for coupling the rear frame support 38 to the rear of the frame 16. The rear of the combine frame 16 should be provided with suitable apertures for receiving bolts which extend through the linkage 51. A stop member 52 protrudes upward from each forward portion 48 of the rear frame support 38. The stop member 52 abuts the rear of the combine frame 16 when the rear frame support 38 is coupled to the frame 16 to facilitate mounting of the rear frame support 38 and to prevent movement of the rear frame support 38 in relation to the frame 16.

Figure 3:
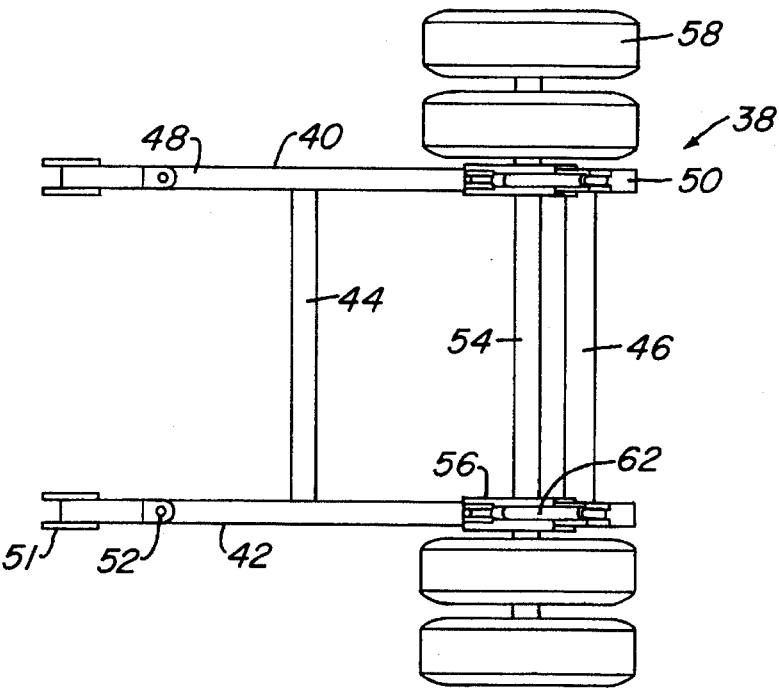
FIG. 3 is a top plan view of the rear frame support of FIG. 2.

Each angled portion 50 of the support members 40, 42 is parallel to the other and extends rearward from the horizontal portion 48 opposite the linkage 51, sloping upward at approximately a 45° angle in relation to the horizontal portion 48 of each support member 40, 42. The cross member 46 extends between the angled portion 50 of the support members 40, 42. An axle 54 also extends between the rearward portion 50 of each support member 40, 42. Each end of the axle 54 is mounted to and supported on a carriage 56 of the angled portion 50 of each support member 40, 42. The carriage 56 of each support member 40, 42 is movable along the angled portion 50 between a retracted position and an extended position. Wheels 58 are rotatably mounted to each end of the axle 54 and are exterior to the support members 40, 42, as shown in FIG. 3.

A hydraulic piston and cylinder 62 is mounted on each angled portion 50 of the support members 40, 42. The upper end of the hydraulic piston and cylinder 62 is stationarily mounted to the angled portion 50, with the lower end being mounted to the carriage 56. The operation of the piston and cylinder 62 allows the carriage 56 to be extended and retracted along the angled portion 50.

Figure 4:
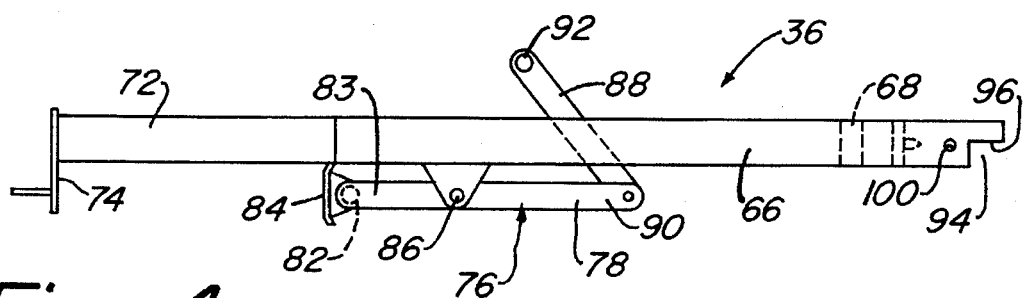
FIG. 4 is a side view of a front frame support of the trailer assembly of FIG. 1 constructed in accordance with the invention.
Figure 5:
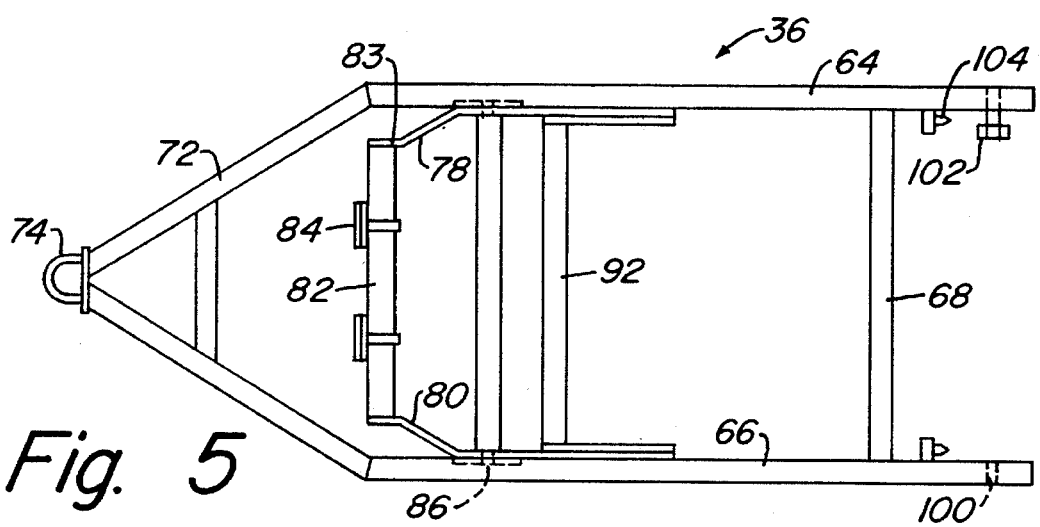
FIG. 5 is a top plan view of the front frame support of FIG. 4.

Referring to FIGS. 4 and 5, the front frame support 36 is comprised of elongated, parallel members 64, 66 which are laterally spaced apart a width slightly greater than the width of the forward end of the combine frame 16. The parallel members 64, 66 are joined together by means of at least one crossbeam 68. Joined at the forward end of the parallel members 64, 66 is a drawbar 72 which consists of an A-frame structure with one end of each leg of the A-frame being joined to one of the parallel members 64, 66 and the other end of the legs being joined together. At the extreme forward end of the drawbar 72, opposite the parallel members 64, 66, is coupling means 74 of conventional design for coupling to a trailer hitch or coupler of a tow vehicle.

Mounted between the parallel members 64, 66 is a support leg 76 comprised of leg members 78, 80. Each leg member 78, 80 is pivotally mounted to one of the parallel members 64, 66 of the front frame support 36. A lower cross member 82 joins each leg member 78, 80 together at a support end 83. Sand shoes 84 are provided on the cross member 82 for contacting and engaging the ground.

As shown in both FIGS. 4 and 5, the leg members 78, 80 are pivotally mounted at their midsections to the members 64, 66 by a hinge 86 or axle extending between the two parallel members 64, 66. This allows the leg members 78, 80 to pivot relative to the parallel members 64, 66. A lift arm linkage 88 is pivotally mounted to a lift end 90 of each leg member 78, 80 opposite the support end 83. The lift arm linkage 88 of each leg member 78, 80 is coupled to the other by means of a crossbar 92 which extends between each linkage 88 between the parallel members 64, 66. The header attachment 18 is provided with a crossbar rest or seat 93 in which the crossbar 92 rests when the front frame support 36 is coupled to the frame 16. It should be noted that the crossbar rest 93 could similarly be provided, for example, on a blade or scoop of a bulldozer or front-end loader as well.

The rearward end of each parallel member 64, 66 has a lower recessed section 94 which defines a lower facing shoulder 96 (FIG. 4). This lower facing shoulder 96 seats or rests on a support 98 of the frame 16, which may be formed by a section of angle iron which is welded or joined to each side of the combine frame 16. An aperture 100 for receiving a bolt 102 is also provided in the rearward end of each parallel member 64, 66. The combine frame 16 should be provided with apertures (not shown) for receiving the bolts 102 so that the front frame support 36 can be effectively coupled to the frame 16. Located on the inner side of the parallel members 64, 66 of the forward frame support 36 are rearward protruding locator pins 104 for contacting and engaging the combine frame 16 to facilitate mounting of the front frame support.

The operation of the trailer assembly is as follows. The front and rear sections of the trailer assembly are positioned adjacent to the combine 10. Initially, the combine 10 is supported on the ground, resting on the tracks 26 so that the frame 16 is spaced above the ground. With the wheels 58 and axle 54 in a retracted position, the forward portion 48 of the rear frame support 38 is aligned with the combine frame 16 in a horizontal position, as shown in FIG. 1. The rear frame support 38 is then positioned so that the stop members 52 engage or abut the rear of the combine frame 16. When the rear frame support 38 is properly positioned, the rear frame support 38 is coupled to the rear of the frame 16 by bolting the linkages 51 to the combine frame 16.

The front frame support 36 is then aligned and coupled to the front of the frame 16. The locator pins 104 contact the frame 16 to indicate that the front frame support 38 is positioned far enough back in relation to the frame 16. When the front frame support 36 is properly positioned, it is coupled to the frame 16 by seating or resting the shoulder 96 of each parallel member 64, 66 on the support 98 provided on the sides of the combine frame 16. Bolts 102 are then passed through the apertures 97 and apertures (not shown) provided in the combine frame 16 to secure the front frame support 36 to the frame 16.

The crossbar 92 is then raised and seated in the rest 93 formed on the header attachment 18. FIG. 1 shows the header attachment 18 in a partially raised position with the support leg 76 being slightly pivoted so that it engages the ground. Initially, however, the header attachment 18 should be in a lowered position so that the leg members 78, 80 are parallel with the parallel members 64, 66 of the front frame support 36, as shown in FIG. 4, when the crossbar 92 is seated in the rest 93 of the header attachment 18.

Figure 6:
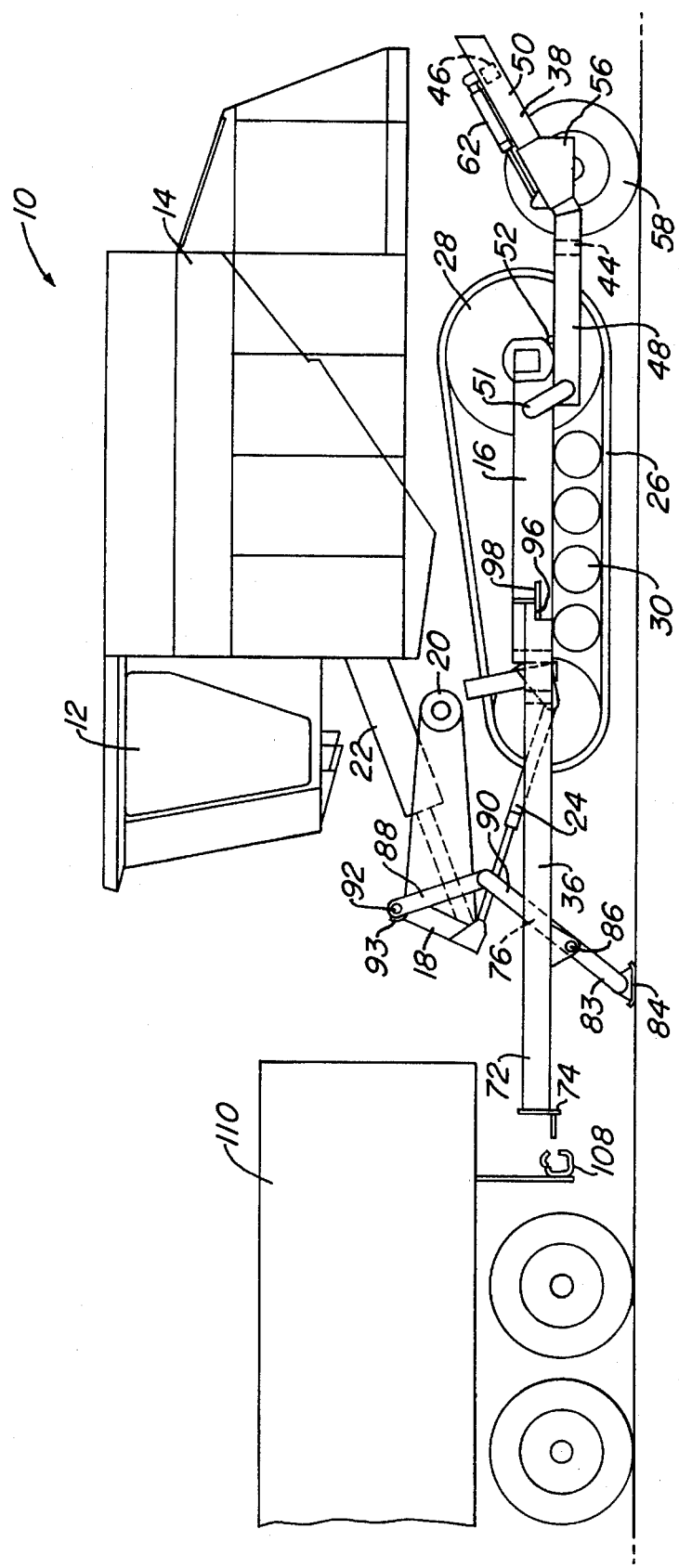
FIG. 6 is a side view of the trailer assembly secured to the combine and with the combine shown in a raised position prior to coupling the trailer assembly to a tow vehicle.

By raising the header attachment 18 by means of the lift cylinder 22 and push cylinder 24, the crossbar 92 is raised so that the support leg 76 is pivoted about the hinge or axle 86 extending between the two parallel members 64, 66. This causes the support end 83 of the legs 78, 80 to pivot downward so that the sand shoes 84 of the cross member 82 engage the ground. By raising the header attachment 18 further, the support leg 76 causes the forward end of the frame 16 of the combine 10 to be lifted, as shown in FIG. 6.

By activating the hydraulic piston and cylinder 62 of the rear frame support 38, the carriage 56 on each angled portion 50 of the support members 40, 42 is lowered or extended along the angled portion 50 so that the wheels 58 engage the ground, lifting the rearward end of the combine frame 16 so that the tracks 26 of the combine 10 are completely raised off the ground. The piston and cylinder 62 on each support member 40, 42 should be synchronized so that each carriage 56 is moved evenly with the other when the piston is extended and retracted within the cylinder 62.

The previously described operation also raises the coupling means 74 of the drawbar 72 to a level where it can engage the hitch 108 of a truck 110 or other tow vehicle. The tow vehicle 110 is then backed towards the drawbar 72 of the front frame support 36 so that hitch 110 can be coupled to the coupling means 74 of the front frame support 36, as shown in FIG. 7.

Figure 7:
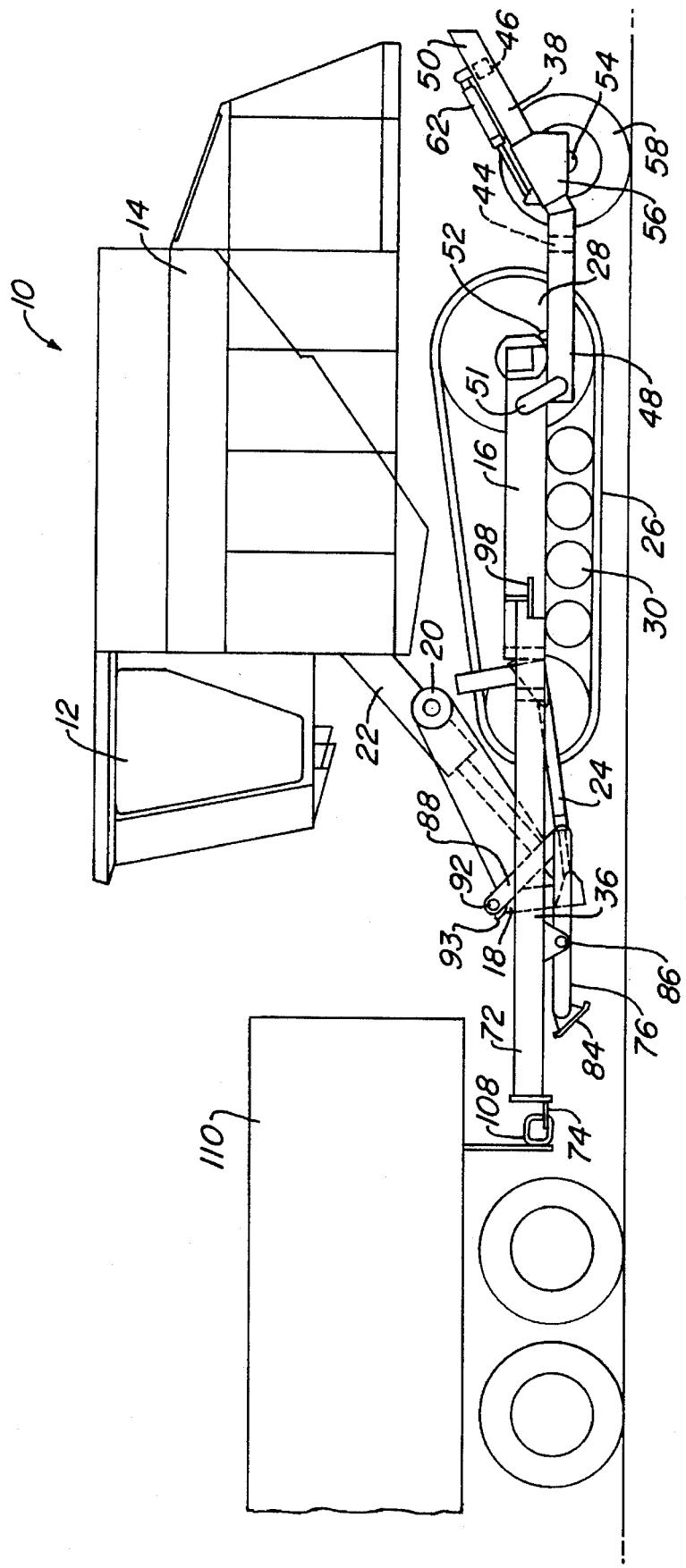
FIG. 7 is a side view of the trailer assembly and combine of FIG. 6, with the trailer assembly shown hitched to the tow vehicle.

Once the drawbar 72 has been coupled to the truck 100, the header attachment 18 may be lowered so that the support leg 76 and the leg members 78, 80 are again parallel with the parallel members 64, 66, as shown in FIG. 7. The carriage 56 of the rear axle 54 of the rear frame support 38 may also be locked into place in the extended position by locking means (not shown) so that the load born by the wheels 58 is transferred to the angled portion 50 of the support members 40, 42 and not to the hydraulic piston and cylinder 62. The combine 10 is thus fully supported on the front and rear frame supports 36, 38 between the drawbar 72, which is coupled to the hitch 108, and the wheels 58 of the rear frame support 38. The hitch 110 should be high enough to keep the tracks 26 from touching the ground when the drawbar 72 is coupled to the tow vehicle 110 and the support leg 76 is retracted. The combine 10 can then be transported to other desired areas.

To unload the combine 10, the header attachment 18 is again raised to a raised position wherein the support leg 76 is pivoted about the hinge or axle 86 of the parallel members of 64, 66 so that the support leg 76 engages the ground and raises the front frame support 36. The truck 110 may then be unhitched from the coupling means 74 of the drawbar 72. After the drawbar 72 is unhitched, the header attachment 18 may be lowered by means of the cylinders 22, 24. The wheels 58 are also retracted by means of the hydraulic piston and cylinder 62 which raises the carriage 56 along the angled portions 50 so that the tracks 26 of the combine 10 engage the ground. The front and rear frame supports are then uncoupled from the frame 16 and the combine 10 can be used in a conventional manner.

FIGS. 8 and 9 show a means for coupling the front and rear frame supports 36, 38 together so that the trailer assembly can be hauled without the combine 10 and can be stored in a minimum of space. FIG. 8 shows the rear frame support 38 after it is disconnected from the frame 16 of the combine 10. With the crossbar 92 still seated or coupled to the header attachment 18, the front frame support 36 is uncoupled from the frame 16 by removing the bolts 102 and unseating the shoulder 96 of each parallel member 64, 66 from the supports 98 of the frame 16. The support leg 76 is positioned parallel with the parallel members 64, 66, as shown in FIG. 4. The linkage 88 is then locked or coupled, by means of a bolt or other conventional fastening device, which is well known to those skilled in the art, to the parallel members 64, 66 so that the support leg 76 remains in a parallel position relative to the parallel members 64, 66. The header attachment 18 is then raised by activating cylinders 22 and 24 so that the whole front frame support 36 is raised along with the header attachment 18 to an inclined position as shown in FIG. 8. Because the linkage 88 is coupled to the parallel members 64, 66, the whole front frame support 36 is raised instead of causing the support leg 76 to pivot.

With the front frame support 36 raised as described, the front frame support 36 can be positioned above the rear frame support 38 utilizing the combine 10. The forward end of the front frame support 36 should overlap the rearward end of the rear frame support 38. The crossbar 92 of the front frame support 36 is then uncoupled from the header attachment 18. The front frame support 36 is then coupled to the rear frame support 38, with the rearward end of the parallel members 64, 66 of the front frame support 36 coupling to the forward ends of the horizontal portions 48 of the support members 40, 42 of the rear frame support 38 and the forward end of the front frame support 36 resting on the cross member 46. With the front and rear frame supports 36, 38 coupled together as described, they can be towed away as a single unit utilizing the drawbar 72 of the front frame support 36.

The trailer assembly of the invention has several advantages over the prior art. Because the trailer assembly is formed from independent front and rear frame supports, it is not necessary to have a full-size trailer in order to transport the combine or vehicle. There is no need to drive the combine onto the trailer. The front and rear frame supports are positioned adjacent to the combine and then the front and rear frame supports are merely coupled to each end of the frame of the combine so that the combine frame and the frame supports act as a single trailer. By utilizing the header or lift cylinder of the combine, the tracks or wheels of the combine can be raised off the ground so that the combine is fully supported on the front and rear frame supports. The wheels or tracks of the combine do not engage the ground even after the lift arm is lowered so that there is no danger of the combine or vehicle contacting the ground or lowering during transport of the combine.

After the combine has been transported to a desired area, the front and rear frame supports can be removed from the frame of the combine and coupled together so that they can be easily towed or stored in a minimum amount of space. Since the trailer is formed from the combine itself, there is no need to strap or secure the combine to the trailer with chains.

While the invention has been shown in only one of its forms, it should be apparent to those skilled in the art that it is not so limited, but it is susceptible to various changes without departing from the scope of the invention.

I claim:

1. A vehicle and trailer assembly comprising in combination:

a vehicle having a frame and a lift arm which is movable between a raised and lowered position, the vehicle being supported on the ground;

a first frame support which couples to one end of the frame;

at least one wheel mounted to the first frame support;

a second frame support which couples to an opposite end of the frame, the frame of the vehicle thereby forming an intermediate section of the trailer assembly between the first and second frame supports; and lift means mounted to the second frame support and coupling to the lift arm of the vehicle, the lift means raising the vehicle from the ground when the lift arm is moved to one of the raised and lowered position so that the vehicle is supported on the first and second frame supports with the wheel of the first frame support in contact with the ground for towing the vehicle; and wherein the first and second frame supports rigidly couple to the vehicle frame.

2. The vehicle and trailer assembly of claim 1, wherein:

the lift means includes a support leg which is releasably coupled to the lift arm of the vehicle and has a support end which engages the ground when the lift arm is moved to said one of the raised and lowered positions to lift the second frame support.

3. The vehicle and trailer assembly of claim 2, wherein:

the support leg is pivotally mounted to the second frame support and is releasably coupled to the lift arm at a lift end located opposite the support end, and wherein the lift arm causes the support leg to pivot relative to the second frame support so that the support end engages the ground when the lift arm is moved to said one of the raised and lowered positions to lift the second frame support.

4. The vehicle and trailer assembly of claim 1, wherein:

the wheel is retractably mounted to the first frame support; and further comprises retracting means for moving the wheel between a retracted and extended position, the wheel raising the first frame support when moved to the extended position to facilitate raising the vehicle off of the ground.

5. The vehicle and trailer assembly of claim 4, wherein:

the retracting means is a cylinder and piston.

6. A vehicle and trailer assembly comprising in combination:

a vehicle having a frame and a lift arm which is movable between a raised and lowered position, the vehicle being supported on the ground;

a first frame support;

first coupling means for releasably coupling the first frame support rigidly to one end of the frame while the vehicle is in contact with the ground;

at least one wheel mounted to the first frame support and movable between a retracted and an extended position;

a second frame support;

second coupling means for releasably coupling the second frame support rigidly to an opposite end of the frame while the vehicle is in contact with the ground, the frame of the vehicle forming an intermediate section rigidly coupling the first and second frame supports together;

wheel retracting means for moving the wheel to the extended position to elevate the first frame support while the frame of the vehicle is coupled to the first and second frame supports to raise at least a portion of the vehicle from the ground;

a support leg which is mounted to the second frame support, and having a support end which engages the ground and is movable between a retracted and an extended position;

support leg retracting means which couples to the lift arm of the vehicle, for moving the support leg to the extended position when the lift arm is moved to one of the raised and lowered positions to lift the second frame support so that in cooperation with the wheel retracting means the vehicle is raised entirely off of the ground and supported on the first and second frame supports by the support leg at one end and the wheel at the opposite end; and a towbar on the second frame support for connection to a hitch for towing, enabling the support leg to be moved by the support leg retracting means to the retracted position, with the second frame support being supported off the ground by the hitch.

7. The vehicle and trailer assembly of claim 6, wherein:

the support leg is pivotally mounted to the second frame support and wherein the support leg retracting means comprises a crossbar on the support leg adapted to be releasably coupled to the lift arm at a lift end located opposite the support end, and wherein the lift arm causes the support leg to pivot relative to the second frame support so that the support end engages the ground when the lift arm is moved to said one of the raised and lowered positions to lift the second frame support.

8. The vehicle and trailer assembly of claim 6, wherein:

the wheel retracting means comprises a piston and cylinder for moving the wheel relative to the first frame support.

9. The vehicle and trailer assembly of claim 6, wherein:

the first frame support has an inclined portion on an end of the first frame support opposite the first coupling means; and wherein the wheel retracting means comprises:

means for moving the wheel along the inclined portion between the retracted and extended positions.

10. The vehicle and trailer assembly of claim 6, wherein:

the first frame support has an inclined portion on an end of the first frame support opposite the first coupling means; and wherein the wheel retracting means comprises:

a piston and cylinder for moving the wheel along the inclined portion between the retracted and extended positions.

11. A vehicle and trailer assembly comprising in combination:

a vehicle having a frame and a lift arm which is movable between a raised and lowered position, the vehicle being supported on the ground;

a first frame support which releasably and rigidly couples to one end of the frame;

at least one wheel mounted to the first frame support;

a second frame support which releasably and rigidly couples to an opposite end of the frame, the frame of the vehicle forming an intermediate section rigidly coupling the first and second frame supports together, the second frame support having a drawbar for coupling to a hitch; and a support leg which is mounted to the second frame support, the support leg being releasably coupled to the lift arm of the vehicle and having a support end which engages the ground when the lift arm is moved to one of the raised and lowered positions to lift the second frame support so that the drawbar can be coupled to the hitch and causing the vehicle to be raised off of the ground and supported on the first and second frame supports.

12. The vehicle and trailer assembly of claim 11, wherein:

the support leg is pivotally mounted to the second frame support and is releasably coupled to the lift arm at a lift end located opposite the support end, and wherein the lift arm causes the support leg to pivot relative to the second frame support so that the support end engages the ground when the lift arm is moved to said one of the raised and lowered positions to lift the second frame support.

13. The vehicle and trailer assembly of claim 11, wherein:

the wheel is retractably mounted to the first frame support; and further comprises:

retracting means for moving the wheel between a retracted and extended position, the wheel raising the first frame support when moved to the extended position to facilitate raising the vehicle off of the ground in conjunction with the support leg.

14. The vehicle and trailer assembly of claim 13, wherein:

the retracting means is a cylinder and piston.

15. The vehicle and trailer assembly of claim 11, wherein:

the first and second frame supports couple together when not being used to tow the vehicle, the second frame support being supported by the first frame support with the drawbar of the second frame support coupling to the trailer hitch so that the first and second frame supports can be towed together.

16. A method of towing a vehicle which is supported on the ground, the vehicle having a frame and a lift arm which is movable between a raised and lowered position, the method comprising the steps of:

rigidly coupling a first frame support having at least one wheel to one end of the frame;

rigidly coupling a second frame support to an opposite end of the frame such that the frame becomes a rigid intermediate section of a trailer, the second frame support having a retractable support leg which engages the lift arm of the vehicle;

extending the support leg into contact with the ground by moving the lift arm to one of the raised and lowered positions to lift the second frame support and the vehicle off of the ground, with the wheel contacting the ground and supporting the first frame support;

providing a drawbar for the second frame support and connecting the drawbar to a hitch; then retracting the support leg and supporting the second frame support with the hitch for towing.

17. The method of claim 16, wherein the support leg is pivotally mounted the second frame support; and wherein the step of extending the support leg includes:

engaging the support leg with the lift arm of the vehicle and pivoting the support leg relative to the second frame support so that the support leg engages the ground when the lift arm is moved to said one of the raised and lowered positions to lift the second frame support.

18. The method of claim 16, further comprising the step of:

retractably mounting the wheel to the first frame support so that the wheel is movable between a retracted and extended position; and wherein the wheel is moved to the extended position so that the first frame support is raised to facilitate raising the vehicle off of the ground in conjunction with the support leg.

19. A vehicle and trailer assembly comprising in combination:

a vehicle having a frame and a lift arm which is movable between a raised and lowered position, the vehicle being supported on the ground;

a first frame support;

first coupling means for releasably coupling the first frame support rigidly to one end of the frame while the vehicle is in contact with the ground;

at least one wheel mounted to the first frame support and movable between a retracted and an extended position;

a second frame support;

second coupling means for releasably coupling the second frame support rigidly to an opposite end of the frame while the vehicle is in contact with the ground, the frame of the vehicle forming an intermediate section rigidly coupling the first and second frame supports together;

wheel retracting means for moving the wheel to the extended position to elevate the first frame support while the frame of the vehicle is coupled to the first and second frame supports to raise at least a portion of the vehicle from the ground;

a support leg which is mounted to the second frame support, and having a support end which engages the ground and is movable between a retracted and an extended position;

support leg retracting means for moving the support leg to the extended position to lift the second frame support so that in cooperation with the wheel retracting means the vehicle is raised entirely off of the ground and supported on the first and second frame supports by the support leg at one end and the wheel at the opposite end; and a towbar on the second frame support for connection to a hitch for towing, enabling the support leg to be moved by the support leg retracting means to the retracted position, with the second frame support being supported off the ground by the hitch; and the first frame support has an inclined portion on an end of the first frame support opposite the first coupling means; and wherein the wheel retracting means comprises:

means for moving the wheel along the inclined portion between the retracted and extended positions.

20. The vehicle and trailer assembly of claim 19, wherein:

the means for moving the wheel includes a piston and cylinder for moving the wheel along the inclined portion between the retracted and extended positions.

* * * * *